United States Patent
Whitby-Strevens

(10) Patent No.: US 7,987,381 B2
(45) Date of Patent: *Jul. 26, 2011

(54) CYCLEMASTER SYNCHRONIZATION IN A DISTRIBUTED BRIDGE

(75) Inventor: Colin Whitby-Strevens, Ben Lomond, CA (US)

(73) Assignee: Apple Inc., Cupertino, CA (US)

( * ) Notice: Subject to any disclaimer, the term of this patent is extended or adjusted under 35 U.S.C. 154(b) by 709 days.

This patent is subject to a terminal disclaimer.

(21) Appl. No.: 11/820,657

(22) Filed: Jun. 19, 2007

(65) Prior Publication Data

US 2008/0034245 A1   Feb. 7, 2008

Related U.S. Application Data

(62) Division of application No. 10/749,613, filed on Dec. 29, 2003, now Pat. No. 7,237,135.

(51) Int. Cl.
    G06F 1/04   (2006.01)
(52) U.S. Cl. .................... 713/401; 713/400; 370/503
(58) Field of Classification Search .................. 713/400, 713/401, 600; 370/503
    See application file for complete search history.

(56) References Cited

U.S. PATENT DOCUMENTS

| | | |
|---|---|---|
| 4,156,798 A | 5/1979 | Doelz |
| 4,194,113 A | 3/1980 | Fulks et al. |
| 5,014,262 A | 5/1991 | Harshavardhana |
| 5,274,631 A | 12/1993 | Bhardwaj |
| 5,321,812 A | 6/1994 | Benedict et al. |
| 5,343,461 A | 8/1994 | Barton et al. |
| 5,394,556 A | 2/1995 | Oprescu |
| 5,406,643 A | 4/1995 | Burke et al. |
| 5,452,330 A | 9/1995 | Goldstein |
| 5,490,250 A | 2/1996 | Reschke et al. |
| 5,490,253 A | 2/1996 | Laha et al. |
| 5,495,481 A | 2/1996 | Duckwall |
| 5,524,254 A | 6/1996 | Morgan et al. |
| 5,539,390 A | 7/1996 | Nagano et al. |
| 5,541,670 A | 7/1996 | Hanai |

(Continued)

FOREIGN PATENT DOCUMENTS

| | | |
|---|---|---|
| EP | 1 085 706 | 3/2001 |
| EP | 1 085 706 | 10/2002 |

OTHER PUBLICATIONS

Bregni et al., Jitter Testing Technique and Results at VC-4 Desynchronizer Output of SDH Equipment, IEEE International Conference on Communications, vol. 3, pp. 1407-1410, May 12, 1994.

(Continued)

*Primary Examiner* — Chun Cao
(74) *Attorney, Agent, or Firm* — Gazdzinski & Associates, PC

(57) ABSTRACT

A method of synchronizing cyclemasters over a distributed bridge is disclosed. The method comprises: a local portal sending a synchronization signal to a peer portal through a bridge fabric upon occurrence of a cycle synchronization event on the local portal; the peer portal sampling its local cycle timer to obtain a sample value when the peer portal receives the synchronization signal; a bridge manager at an upstream portal communicating the sample value to a bridge manager at an alpha portal; the bridge manager at the alpha portal using the sampled time value to compensate for delays through a bridge fabric, calculate the correction to be applied to a cycle timer associated with the alpha portal, and correct the cycle timer.

26 Claims, 4 Drawing Sheets

U.S. PATENT DOCUMENTS

| | | | |
|---|---|---|---|
| 5,568,487 A | 10/1996 | Sitbon et al. |
| 5,568,641 A | 10/1996 | Nelson et al. |
| 5,583,922 A | 12/1996 | Davis et al. |
| 5,621,659 A | 4/1997 | Matsumoto et al. |
| 5,630,173 A | 5/1997 | Oprescu |
| 5,632,016 A | 5/1997 | Hoch et al. |
| 5,640,595 A | 6/1997 | Baugher et al. |
| 5,642,515 A | 6/1997 | Jones et al. |
| 5,654,657 A | 8/1997 | Pearce |
| 5,684,715 A | 11/1997 | Palmer |
| 5,701,476 A | 12/1997 | Fenger |
| 5,701,492 A | 12/1997 | Wadsworth et al. |
| 5,706,278 A | 1/1998 | Robillard et al. |
| 5,712,834 A | 1/1998 | Nagano et al. |
| 5,719,862 A | 2/1998 | Lee et al. |
| 5,754,765 A | 5/1998 | Danneels et al. |
| 5,764,930 A | 6/1998 | Staats |
| 5,784,648 A | 7/1998 | Duckwall |
| 5,802,048 A | 9/1998 | Duckwall |
| 5,802,057 A | 9/1998 | Duckwall et al. |
| 5,802,365 A | 9/1998 | Kathail et al. |
| 5,805,073 A | 9/1998 | Nagano et al. |
| 5,809,331 A | 9/1998 | Staats et al. |
| 5,819,115 A | 10/1998 | Hoese et al. |
| 5,822,571 A | 10/1998 | Goodrum et al. |
| 5,826,027 A | 10/1998 | Pedersen et al. |
| 5,832,298 A | 11/1998 | Sanchez et al. |
| 5,835,761 A | 11/1998 | Ishii et al. |
| 5,845,152 A | 12/1998 | Anderson et al. |
| 5,867,730 A | 2/1999 | Leyda |
| 5,875,301 A | 2/1999 | Duckwall et al. |
| 5,923,663 A | 7/1999 | Bontemps et al. |
| 5,930,480 A | 7/1999 | Staats |
| 5,935,208 A | 8/1999 | Duckwall et al. |
| 5,938,764 A | 8/1999 | Klein |
| 5,940,600 A | 8/1999 | Staats et al. |
| 5,954,796 A | 9/1999 | McCarty et al. |
| 5,968,152 A | 10/1999 | Staats |
| 5,970,052 A | 10/1999 | Lo et al. |
| 5,987,605 A | 11/1999 | Hill et al. |
| 5,991,842 A | 11/1999 | Takayama |
| 6,006,286 A | 12/1999 | Baker et al. |
| 6,009,480 A | 12/1999 | Pleso |
| 6,032,202 A | 2/2000 | Lea et al. |
| 6,032,261 A | 2/2000 | Hulyalkar |
| 6,038,234 A | 3/2000 | LaFollette et al. |
| 6,038,625 A | 3/2000 | Ogino et al. |
| 6,070,187 A | 5/2000 | Subramaniam et al. |
| 6,073,206 A | 6/2000 | Piwonka et al. |
| 6,091,726 A | 7/2000 | Crivellari et al. |
| 6,115,764 A | 9/2000 | Chisholm et al. |
| 6,122,248 A | 9/2000 | Murakoshi et al. |
| 6,128,318 A | 10/2000 | Sato |
| 6,131,129 A | 10/2000 | Ludtke et al. |
| 6,131,134 A | 10/2000 | Huang et al. |
| 6,131,163 A | 10/2000 | Wiegel |
| 6,133,938 A | 10/2000 | James |
| 6,138,196 A | 10/2000 | Takayama et al. |
| 6,141,702 A | 10/2000 | Ludtke et al. |
| 6,141,767 A | 10/2000 | Hu et al. |
| 6,145,018 A | 11/2000 | LaFollette et al. |
| 6,157,972 A | 12/2000 | Newman et al. |
| 6,160,796 A | 12/2000 | Zou |
| 6,167,532 A | 12/2000 | Wisecup |
| 6,173,327 B1 | 1/2001 | De Borst et al. |
| 6,192,189 B1 | 2/2001 | Fujinami et al. |
| 6,199,119 B1 | 3/2001 | Duckwall et al. |
| 6,202,210 B1 | 3/2001 | Ludtke |
| 6,212,171 B1 | 4/2001 | LaFollette et al. |
| 6,212,633 B1 | 4/2001 | Levy et al. |
| 6,219,697 B1 | 4/2001 | Lawande et al. |
| 6,226,680 B1 | 5/2001 | Boucher et al. |
| 6,233,615 B1 | 5/2001 | Van Loo |
| 6,233,624 B1 | 5/2001 | Hyder et al. |
| 6,243,778 B1 | 6/2001 | Fung et al. |
| 6,247,063 B1 | 6/2001 | Ichimi et al. |
| 6,247,083 B1 | 6/2001 | Hake et al. |
| 6,253,114 B1 | 6/2001 | Takihara |
| 6,253,255 B1 | 6/2001 | Hyder et al. |
| 6,256,059 B1 | 7/2001 | Fichtner |
| 6,260,063 B1 | 7/2001 | Ludtke et al. |
| 6,266,334 B1 | 7/2001 | Duckwall |
| 6,266,344 B1 | 7/2001 | Fujimori et al. |
| 6,266,701 B1 | 7/2001 | Sridhar et al. |
| 6,275,889 B1 | 8/2001 | Saito |
| 6,282,597 B1 | 8/2001 | Kawamura |
| 6,292,840 B1 | 9/2001 | Brown et al. |
| 6,295,479 B1 | 9/2001 | Shima et al. |
| 6,308,222 B1 | 10/2001 | Krueger et al. |
| 6,311,228 B1 | 10/2001 | Ray |
| 6,314,461 B2 | 11/2001 | Duckwall et al. |
| 6,333,938 B1 | 12/2001 | Baker |
| 6,343,321 B2 | 1/2002 | Patki et al. |
| 6,345,315 B1 | 2/2002 | Mishra |
| 6,347,362 B1 | 2/2002 | Schoinas et al. |
| 6,353,868 B1 | 3/2002 | Takayama et al. |
| 6,356,558 B1 | 3/2002 | Hauck et al. |
| 6,363,085 B1 | 3/2002 | Samuels |
| 6,373,821 B2 | 4/2002 | Staats |
| 6,385,679 B1 | 5/2002 | Duckwall et al. |
| 6,405,247 B1 | 6/2002 | Lawande et al. |
| 6,411,628 B1 | 6/2002 | Hauck et al. |
| 6,418,150 B1 | 7/2002 | Staats |
| 6,425,019 B1 | 7/2002 | Tateyama et al. |
| 6,426,962 B1 | 7/2002 | Cabezas et al. |
| 6,442,630 B1 | 8/2002 | Takayama et al. |
| 6,445,711 B1 | 9/2002 | Scheel et al. |
| 6,446,116 B1 | 9/2002 | Burridge |
| 6,446,142 B1 | 9/2002 | Shima et al. |
| 6,452,975 B1 | 9/2002 | Hannah |
| 6,457,086 B1 | 9/2002 | Duckwall |
| 6,466,982 B1 | 10/2002 | Ruberg |
| 6,496,862 B1 | 12/2002 | Akatsu et al. |
| 6,502,144 B1 | 12/2002 | Accarie |
| 6,513,085 B1 | 1/2003 | Gugel et al. |
| 6,519,657 B1 | 2/2003 | Stone et al. |
| 6,529,522 B1 | 3/2003 | Ito et al. |
| 6,567,876 B1 | 5/2003 | Stufflebeam |
| 6,574,588 B1 | 6/2003 | Shapiro et al. |
| 6,587,904 B1 | 7/2003 | Hauck et al. |
| 6,591,300 B1 | 7/2003 | Yurkovic |
| 6,606,320 B1 | 8/2003 | Nomura et al. |
| 6,618,750 B1 | 9/2003 | Staats |
| 6,618,785 B1 | 9/2003 | Whitby-Streves |
| 6,621,832 B2 | 9/2003 | Staats |
| 6,628,607 B1 | 9/2003 | Hauck et al. |
| 6,631,426 B1 | 10/2003 | Staats |
| 6,636,914 B1 | 10/2003 | Teener |
| 6,639,918 B1 | 10/2003 | Hauck et al. |
| 6,643,714 B1 | 11/2003 | Chrysanthakopoulos |
| 6,671,768 B1 | 12/2003 | Brown |
| 6,686,838 B1 | 2/2004 | Rezvani et al. |
| 6,691,096 B1 | 2/2004 | Staats |
| 6,718,497 B1 | 4/2004 | Whitby-Strevens |
| 6,879,602 B1 | 4/2005 | Sugita et al. |
| 6,954,467 B1 | 10/2005 | Hillier et al. |
| 7,237,135 B1 * | 6/2007 | Whitby-Strevens .......... 713/401 |
| 2001/0001151 A1 | 5/2001 | Duckwall et al. |
| 2001/0019561 A1 | 9/2001 | Staats |
| 2001/0024423 A1 | 9/2001 | Duckwall et al. |
| 2002/0057655 A1 | 5/2002 | Staats |
| 2002/0085581 A1 | 7/2002 | Hauck et al. |
| 2002/0101231 A1 | 8/2002 | Staats |
| 2002/0103947 A1 | 8/2002 | Duckwall et al. |
| 2002/0172226 A1 | 11/2002 | Staats |
| 2002/0188780 A1 | 12/2002 | Duckwall |
| 2002/0188783 A1 | 12/2002 | Duckwall et al. |
| 2003/0037161 A1 | 2/2003 | Duckwall et al. |
| 2003/0055999 A1 | 3/2003 | Duckwall et al. |
| 2004/0037309 A1 | 2/2004 | Hauck et al. |

OTHER PUBLICATIONS

"Information technology-Microprocessor systems-Control and Status Registers (CSR) Architecture for microcomputer buses", ANSI/IEEE Standard 1212, The Institute of Electrical and Electronics Engineers, Inc. pp. 1-122, 1994 Edition.

Bregni et al., Jitter Testing Technique and Results at VC-4 Desynchronizer Output of SDH Equipment, IEEE Transactions on Instrumentation and Measurement, vol. 44, Issue 3, pp. 675-678, Jun. 1995.

"IEEE Standard for a High Performance Serial Bus", IEEE Standard 1394-1995, Institute of Electrical and Electronics Engineers, Inc., pp. 1-384, approved Jul. 22, 1996.

Shiwen et al., Parallel Positive Justification in SDH C.sub.—4 Mapping, IEEE International Conference on Communications, vol. 3, pp. 1577-1581, Jun. 12, 1997.

"AV/C Digital Interface Command Set General Specification, Rev. 3.0", 1394 Trade Association, pp. 4-5, 20-34, Apr. 15, 1998.

"Enhancements to the AV/C General Specification 3.0 Version 1.0FC1", 1394 Trade Association, pp. 4, 6-17, Nov. 5, 1998.

"Information Technology-Fibre Channel-Methodologies for Jitter Specification", NCITS TR-25-1999, Jitter Working Group Technical Report, Rev. 10, pp. 1-96, Jun. 9, 1999.

"P1394a Draft Standard for a High Performance Serial Bus (Supplement)", Draft 3.0, Institute of Electrical and Electronics Engineers, Inc., pp. 1-187, Jun. 30, 1999.

"IEEE Standard for a High Performance Serial Bus-Amendment I", Institute of Electrical and Electronics Engineers, Inc., pp. 1-196, approved Mar. 30, 2000.

P1394b IEEE Draft Standard for a High Performance Serial Bus (High Speed Supplement) P1394b Draft 1.3.3, Institute of Electrical and Electronics Engineers, Inc., pp. 1-408, Nov. 16, 2001.

"IEEE Standard for a High Performance Serial Bus-Amendment 2", Institute of Electrical and Electronics Engineers, Inc., pp. 1-369, 2002 (no month).

* cited by examiner ns
CYCLEMASTER SYNCHRONIZATION IN A DISTRIBUTED BRIDGE

This application is a divisional of and claims priority to U.S. patent application Ser. No. 10/749,613 of the same title filed Dec. 29, 2003 now U.S. Pat. No. 7,237,135, incorporated herein by reference in its entirety.

FIELD OF THE INVENTION

The present invention relates broadly to synchronizing devices in communication with each other over a serial bus connection. Specifically, the present invention relates to synchronizing cyclemasters across a distributed bridge architecture in a IEEE 1394-compliant network.

BACKGROUND OF THE INVENTION

The Institute of Electrical and Electronic Engineers (IEEE) has promulgated a number of versions of a high speed serial bus protocol falling under the IEEE 1394 standard (referred to herein collectively as "1394"). A typical serial bus having a 1394 architecture interconnects multiple node devices via point-to-point links, such as cables, each connecting a single node on the serial bus to another node on the serial bus. Data packets are propagated throughout the serial bus using a number of point-to-point transactions, such that a node that receives a packet from another node via a first point-to-point link retransmits the received packet via other point-to-point links. A tree network configuration and associated packet handling protocol ensures that each node receives every packet once. The 1394-compliant serial bus may be used as an alternate bus for the parallel backplane of a computer system, as a low cost peripheral bus, or as a bus bridge between architecturally compatible buses.

The 1394 standard specifies two primary types of bus access: asynchronous access and isochronous access. Asynchronous access may be described as either "fair" or "priority." Priority access is used by nodes that need the next available asynchronous opportunity to transfer data. Isochronous access is used by nodes that require guaranteed bandwidth with bounded latency, for example, nodes transmitting video or audio data. The transactions for each type of bus access are comprised of at least one subaction, wherein a subaction is a complete one-way transfer operation.

In the case of digital video data transfers within 1394-compliant systems, the video data may be transferred between a mass storage device and a digital video camera or other recorder under the control of a computer processor or other device. The video data is transferred as a series of frames, each frame being made up of a number of data packets. The individual data packets include a number header fields as well as the video data itself. In order to ensure that each frame of the video data is played out in the proper sequence, the frames are time stamped with an appropriate frame presentation time measured in terms of cycle time of an isochronous transaction on a 1394-compliant bus when they are recorded. The cycle time is maintained by a cyclemaster as described in the 1394 standard. The cyclemaster uses priority access to broadcast a cycle start packet. This initiates an isochronous cycle, during which nodes can use isochronous access, and contains the cyclemaster's cycle time clock information so that all nodes associated maintain the necessary synchronization for audio and video data.

Bus bridges between multiple buses of devices forward request and response subactions from one bus to another, allowing transaction requester and responder components to be located on different buses. Each bus has its own cyclemaster. An exemplary 1394-compliant network of three buses of devices is illustrated in FIG. 1. The first bus includes devices a1, a2, and a3 coupled together by 1394-compliant cables. Specifically, device a1 is coupled to device a2 by cable 40. Device a2 is coupled to device a3 by cable 42. Device a3 is then coupled to portal 22 of bridge 20. Bridge 20 couples the first bus to a second bus, which includes the devices b1, b2 and b3. Portal 24 of bridge 20 is coupled to device b1 by cable 46. Device b1 is coupled to device b2 by cable 48. Device b1 is coupled to device b2 by cable 48. Device b2 is coupled to device b3 by cable 50. Device b3 is coupled to portal 32 of bridge 30. Bridge 30 couples the second bus to a third bus that includes the devices c1 and c2. A second portal 34 of bridge 30 is coupled to device c1 by cable 54. Device c1 is coupled to device c2 by cable 56. Bridges 20 and 30 allow devices on the different buses to communicate with each other using both asynchronous and isochronous communications. For example, if device a1 sends a communication to device b3, the communication is passed along the first bus until it reaches portal 22 of bridge 20. Bridge 20 then recognizes that the communication is addressed to the device b3 and forwards the communication from portal 22 to portal 24.

The 1394 standard requires that 1394 bridges implement a method by which all the cyclemasters in a network are kept in phase. The topology used to model the method is shown in FIG. 2. One cycle master is elected to be the master or net cyclemaster. Cyclemasters on buses directly attached to the bus with the net cycle master are kept in phase with the net cycle master. In turn, other buses attached to these buses are kept in phase with the cycle masters on these buses, and so on. Each bridge is responsible for calculating the amount by which the cyclemaster on the bus on its alpha portal (the portal away from the net cyclemaster) is out of phase with the cyclemaster on the bus on its other portal, and accordingly issuing cyclemaster adjustment commands to the cyclemaster on its alpha portal to shorten or lengthen the cycle by one cycle_offset unit (40 ns). According to the method of the 1394 standard, the phase difference is sampled once during each isochronous period. The bridge simultaneously samples the value of CYCLE_TIME.cycle_offset for both of its portals and subtracts, modulus 3072, the upstream portal's cycle offset from the alpha portal's cycle offset.

FIG. 3 illustrates how the delay from the cyclemasters to the respective portals is considered by the 1394 standard method. The two cycle timers connected to the bridge provide, when simultaneously sampled, CYCLE_TIME.cycle_offset values denoted as upstreamOffset and alphaOffset respectively. In the example illustrated in FIG. 3, the upstream delay is 42 units, and the alpha delay is 17 units (as per the example in section 4.4 of the IEEE Serial Bus Protocol 1394.1). When the two cycle timers are simultaneously sampled, the correction to be applied to the alpha cyclemaster is $(208+17)-(193+42)=-10$. This negative value is interpreted as a "go faster" command, which causes the alpha cyclemaster to wrap at 3070 instead of 3071. The expectation is that on the next isochronous cycle, the difference will then be −9, and the method eventually brings the difference to a zero value.

However, in a distributed bridge, where the two portals are connected by a long haul or wireless medium, there may be no common clock to be sampled by the cycle timers simultaneously, so the method taught by the 1394 standard is useless. It is now desirable to attach devices by wireless connections to 1394 buses, as well as by significantly longer cable lengths.

Thus, there is a heartfelt need to provide synchronization of cyclemasters that facilitate connecting wireless or longhaul connections.

SUMMARY

In one aspect of the present invention, a computerized system disclosed. In one embodiment, the computerized system includes: a plurality of buses interconnected by a plurality of bridges, the plurality of bridges comprising a first bridge and a second bridge, the second bridge comprising a first portal. The first bridge comprises a second portal, a third portal, and a bridge fabric, the first portal being in communication with the third portal via the bridge fabric. The second portal is adapted to receive a cycle synchronization event and upon receiving said event, transmit a synchronization signal through the bridge fabric to the third portal. The third portal is adapted to receive the synchronization signal, sample a local timer to obtain a sample value, and transmit the sample value to the first portal. The first portal is adapted to receive the sample value, use the sample value to compensate for at least some delays in transmission over the bridge, and calculate a correction to be applied to a timer associated with the first portal is disclosed.

In another aspect of the present invention, a bridge apparatus is disclosed. In one embodiment, the bridge apparatus includes: a first module adapted to measure delays in propagation over the bridge fabric; a second module adapted to access a timer associated with the first portal, and provide a sample value based at least in part on said access; and a third module adapted to calculate a correction to be applied to a timer associated with a downstream portal if the sample value is provided within a first time period. The correction is based at least in part upon the sample value and upon delays in propagation over the bridge fabric.

In an alternate embodiment, the bridge apparatus includes: a first module adapted to generate an error condition if a downstream device does not receive a first sample value and a second sample value within a first time period; a second module adapted to sample a timer associated with the first portal to obtain the first sample value; a third module adapted to sample a timer associated with the second portal to obtain the second sample value; and a fourth module adapted to calculate delays in propagation over said bridge device. The bridge device is adapted to communicate with software configured to transmit the first sample value and the second sample value to the downstream device.

In another aspect of the present invention, a computerized system for synchronizing devices in communication with each other over a serial bus connection is disclosed. In one embodiment, the computerized system includes: a plurality of buses interconnected by a plurality of bridges, the plurality of bridges comprising a first bridge and a second bridge. The second bridge includes a first portal, and the first bridge comprises a second portal, a third portal, and a bridge fabric. The first portal is in communication with the third portal via the bridge fabric, and is adapted to perform calculation of a correction only when a sample value is received by the first portal within a first time period, and indicate an error condition at least when the sample value is not received by the first portal within the first time period. The second portal is adapted to receive a cycle synchronization event and upon receiving the event, transmit a synchronization signal through the bridge fabric to the third portal. The third portal is adapted to receive the synchronization signal, sample a local timer to obtain a sample value, and transmit the sample value to the first portal.

In another aspect of the invention, a method for bridging a first portal that is in data communication with a second portal is disclosed. In one embodiment, the first and second portals are in communication via a bridge fabric, and the method includes: measuring delays in propagation over the bridge fabric; accessing a timer associated with the first portal, and providing a sample value based at least in part on said access; and calculating a correction to be applied to a timer associated with a downstream portal if the sample value is provided within a first time period. The correction is based at least in part upon the sample value and upon delays in propagation over the bridge fabric.

Many other features and advantages of the present invention will be realized upon reading the following detailed description, when considered in conjunction with the accompanying drawings, in which:

DETAILED DESCRIPTION

Embodiments of the present invention utilize the following calculations. a1_co represents the alpha portal cycle offset at any moment in time. up_co represents the upstream portal cycle offset at any moment in time. d represents the real difference between the two cycle offset values (a1_co−up_co). For the time period covered by the sampling time of the algorithm, d is assumed constant, and represents the difference between the "simultaneous sample" values as expressed in the 1394.1 algorithm. fd represents the fabric delay (assumed constant and the same in both directions). up_co' represents the sampled value of the upstream portal cycle offset when the sampling signal is received from the alpha portal. Then, $$\text{up\_co'} = d + \text{fd} \quad (1)$$

a1_co represents the sampled value of the alpha portal cycle offset when the sampling signal is received from the upstream portal. Then, $$a1\_co = -d + \text{fd} \quad (2)$$

Subtracting (1) from (2) eliminates the fabric delay $$a1\_co - \text{up\_co'} = -d + \text{fd} - (d + \text{fd}) = -2d \quad (3)$$

Hence $d = -(a1\_co - \text{up\_co'})/2 \quad (4)$

Figure 1:
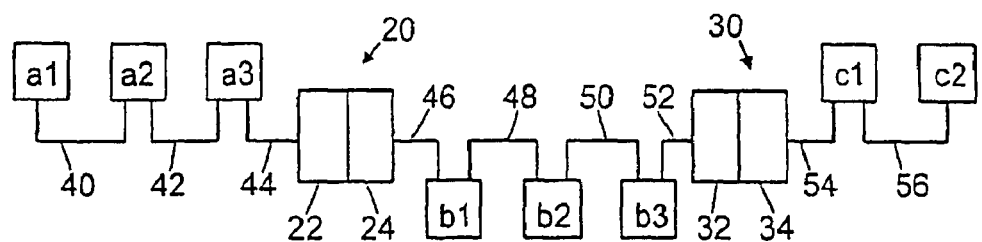
FIG. 1 illustrates in block diagram form a 1394-compliant network of buses connected by bridges.
Figure 2:
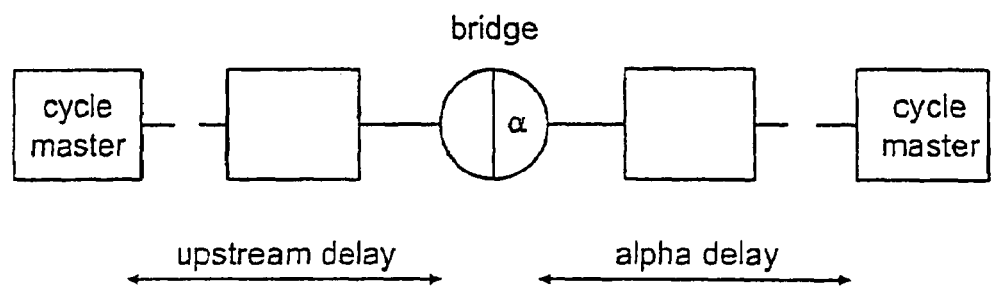
FIG. 2 illustrates a bridge connecting buses having separate cyclemasters.
Figure 3:
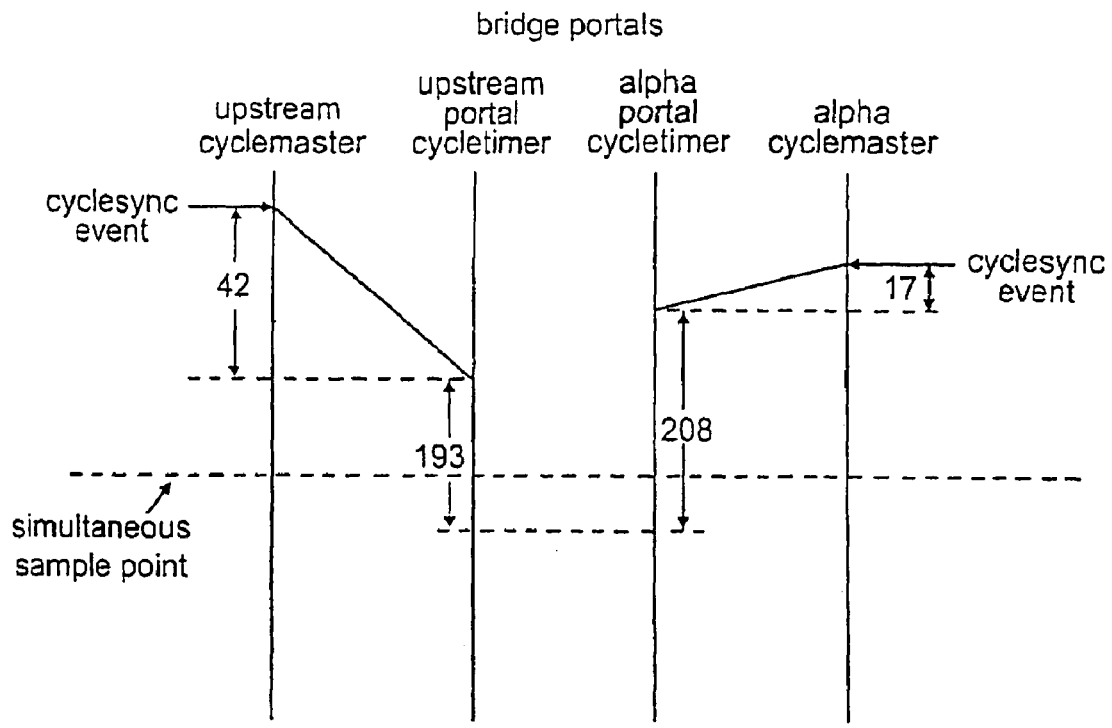
FIG. 3 is a timing diagram that illustrates how cyclemaster synchronization is performed in accordance with prior art 1394 methods.
Figure 4:
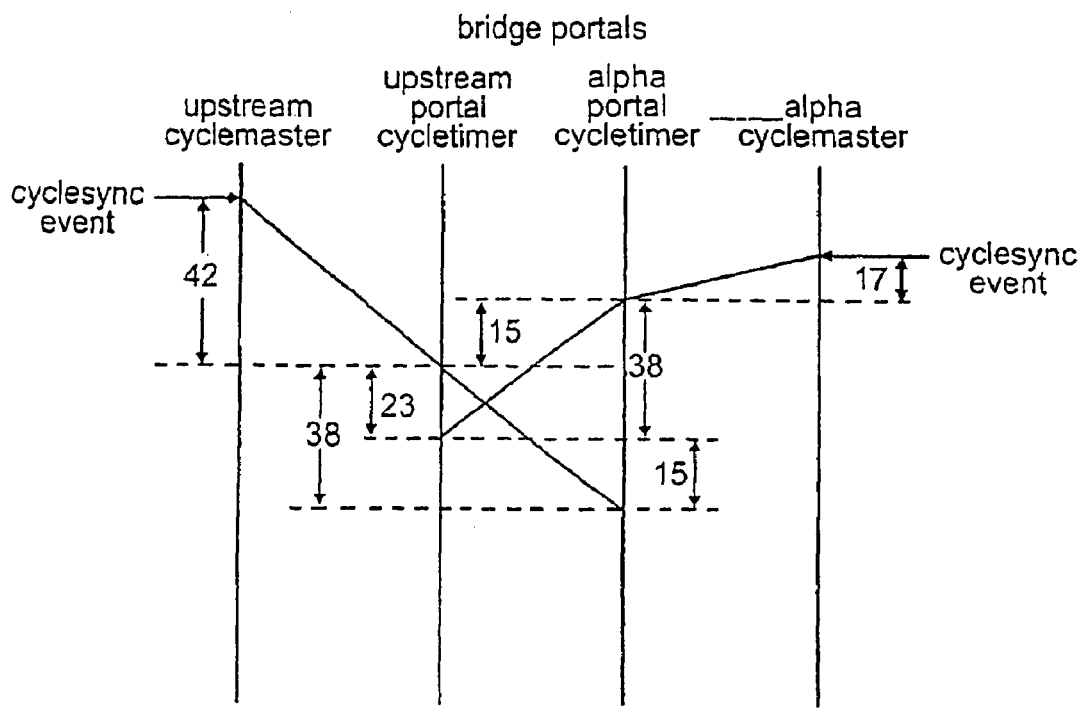
FIG. 4 is a timing diagram that illustrates how cyclemaster synchronization in a distributed bridge is performed in accordance with the present invention.

FIG. 4 illustrates the application of formulae (1)-(4), where d=−15, and fd=38. In this embodiment, the upstream portal samples the value 23 when it receives the sampling signal from the alpha portal, and communicates this value to the alpha portal. The alpha portal samples the value 53 when it receives the sampling signal from the upstream portal. When it receives the value 23 from the upstream portal, the difference is calculated as −(23−53)/2=15. In a preferred embodiment, the arithmetic is performed modulo 3072. The isochronous cycle repeats on a nominal 8 Kz clock (125 usec). The cyclemaster clock is itself a 25 Mhz clock. 3072 ticks of this clock measures 125 microseconds. Thus in normal cyclemaster behavior when the cycle offset reaches 3072, a new isochronous cycle is started and the cycle offset reset to zero.

Figure 5:
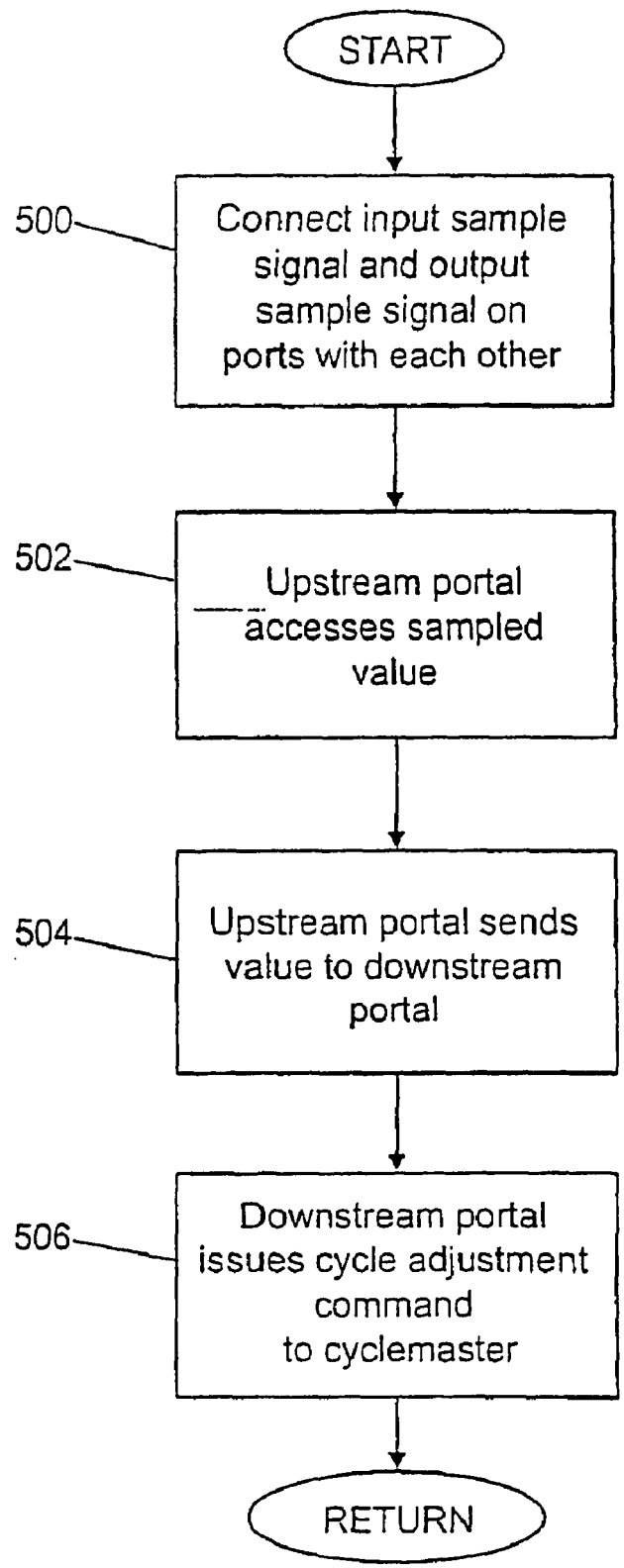
FIG. 5 is a flowchart illustrating a sequence of acts executed in accordance with an embodiment of the present invention.

In an embodiment of the present invention, bridge link hardware incorporates an output sample signal, an input sample signal, and a software readable register for storing the sampled values. Directing attention to FIG. 5, the bridge link fabric connects the four signals (output from one portal to the input of the other portal and vice versa) with a constant delay (act 500). Jitter on the delay is bounded by 20 ns-40 ns, preferably closer to 20 ns. The value of the delay is immaterial, except that the sampled value is subsequently accessed by software in the upstream portal (act 502) and communicated to the downstream portal (act 504) in sufficient time for the downstream portal to issue the cycle adjustment command to the cyclemaster (act 504). In the preferred embodiment, the bridge portal hardware also generates an interrupt signal when it takes a sample, and so is ready for software to read the sample and either send it to the alpha portal (upstream portal) or perform the cycle adjustment calculation (alpha portal). An indication, such as error flag, is made by the bridge fabric if either of the sampled signals is not delivered on time. Software uses the indication to abandon cyclemaster adjustment for the current isochronous cycle. Leaving the cyclemaster unadjusted is not problematic if error indications occur rarely. Alternatively, a double-sample scheme similar to the one described below may be used to provide redundancy.

Figure 6:
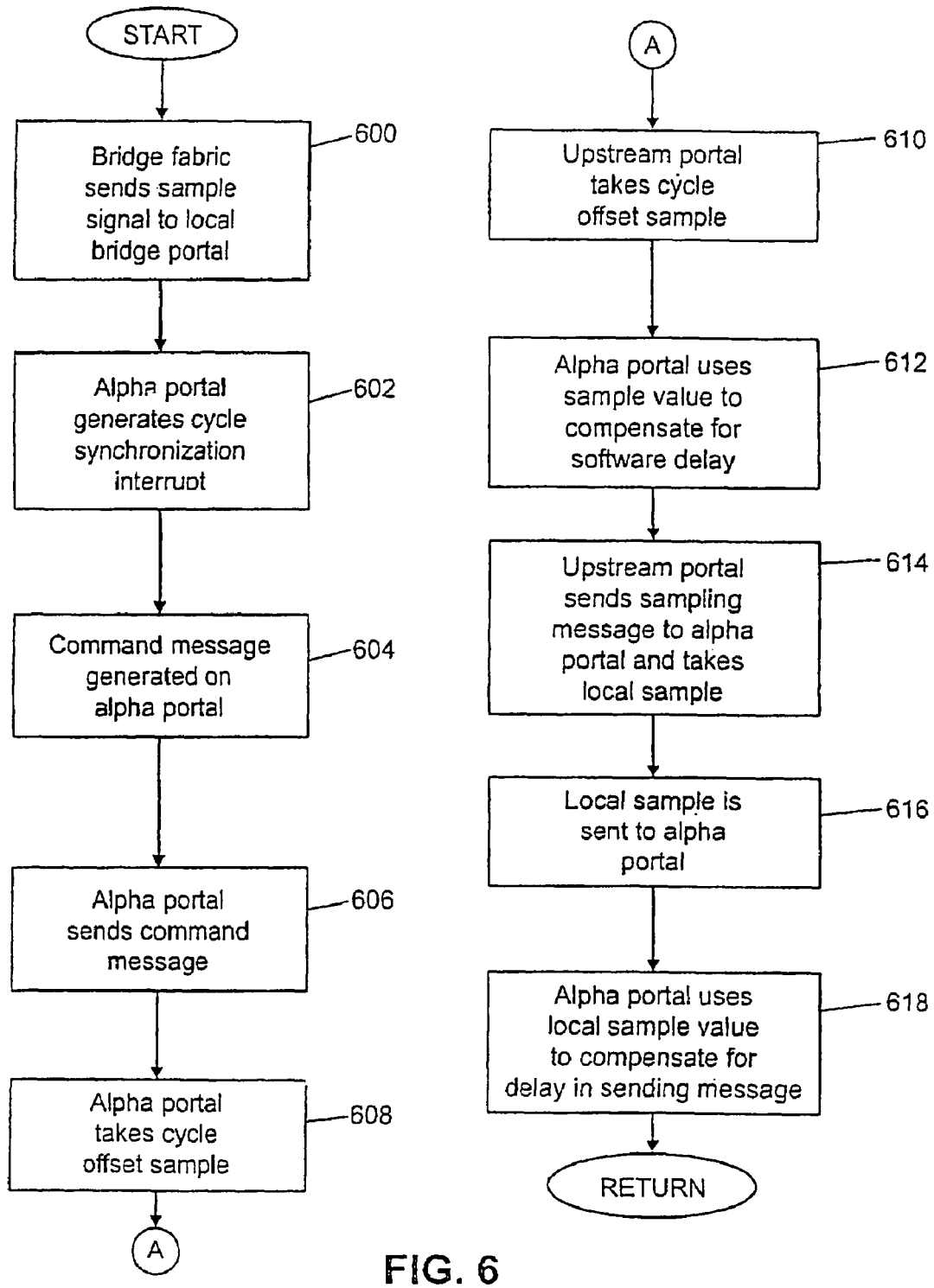
FIG. 6 is a flowchart illustrating a sequence of acts executed in accordance with another embodiment of the present invention.

In another embodiment of the present invention, a combined hardware and software implementation can be utilized to provide synchronization of cyclemasters over a distributed bridge. Directing attention to FIG. 6, in this embodiment, the portals have two sample inputs and two registers. The bridge fabric sends sampling signals (act 600) to the local bridge portal at the moment that a message is launched across the bridge fabric and at the moment that a message arrives from the bridge fabric. These signals are used to trigger the sampling mechanisms in the bridge. The alpha portal generates a cycle synchronization interrupt to the local bridge management software (act 602). This queues an appropriate command message to send to its peer across the bridge fabric (act 604). At the moment that the message is launched (act 606), the bridge fabric hardware triggers a cycle_offset sample in the alpha portal bridge hardware (act 608). At the moment that the message arrives at the upstream portal, the bridge fabric hardware triggers the cycle_offset sample in the upstream portal (act 610). The alpha portal uses the local sample to compensate for the software delay in sending the sampling message (act 612). Similarly, the upstream portal takes a local sample at the moment that it sends its sampling message to the alpha portal (act 614). Software in the upstream portal subsequently communicates this value to the software in the alpha portal (act 616), so that software in the alpha portal can compensate for the software delay in the upstream portal in sending the sampling message to the alpha portal (act 618). At this point, the alpha portal now has enough information to determine whether an adjustment to the cyclemaster on its local bus is necessary, and if so command that adjustment. The signals used by the bridge fabric hardware can be readily derived from existing signals. For example, the sampling signal on message arrival can be the same signal as is used to generate an interrupt. Care needs to be taken that the samples are not overwritten by subsequent message transmissions/arrivals before they have been read by software. However, taking samples, for example, on every message, regardless of whether the message is a sampling message or not, is relatively safe. If a message transmission fails for some reason, then it can be retried. In a preferred embodiment, a polling scheme performs the retries and sets a flag when message transmission is complete. If the bridge fabric supports automatic retries, which may affect delivery latency, then the sampling signal for transmit is reasserted.

While embodiments of methods and apparatus for synchronizing cyclemasters over distributed bridges has been illustrated and described, it is to be understood that many variations can be made to embodiments of the present invention, without departing from the spirit thereof.

What is claimed is:

1. A computerized system, comprising:
a plurality of buses interconnected by a plurality of bridges, said plurality of bridges comprising a first bridge and a second bridge, the second bridge comprising a first portal;
wherein the first bridge comprises a second portal, a third portal, and a bridge fabric, the first portal in communication with the third portal via the bridge fabric;
wherein the second portal is adapted to receive a cycle synchronization event and upon receiving said event, transmit a synchronization signal through the bridge fabric to the third portal;
wherein the third portal is adapted to receive the synchronization signal, sample a local timer to obtain a sample value, and transmit the sample value to the first portal;
wherein the first portal is adapted to receive the sample value, use the sample value to compensate for at least some delays in transmission over the bridge, and calculate a correction to be applied to a timer associated with the first portal.

2. The system of claim 1, wherein the first portal is adapted to perform said calculation of said correction only when the sample value is received by the first portal within a first time period.

3. The system of claim 1, wherein the first portal comprises an alpha portal, the alpha portal being further adapted to correct the timer associated with the alpha portal if the sample value is received by the alpha portal within the first time period.

4. A bridge device for use with a first portal that is in data communication with a second portal via a bridge fabric, the device comprising:
a first module adapted to measure delays in propagation over the bridge fabric;
a second module adapted to access a timer associated with the first portal, and provide a sample value based at least in part on said access;
a third module adapted to calculate a correction to be applied to a timer associated with a downstream portal if the sample value is provided within a first time period, wherein said correction is based at least in part upon the sample value and upon delays in propagation over the bridge fabric.

5. The bridge device of claim 4, further comprising the downstream portal; wherein the third module is associated with the downstream portal.

6. The bridge device of claim 4, wherein the second module is further adapted to generate an interrupt when the timer associated with the first portal is sampled.

7. The bridge device of claim 4, further comprising a sample value register, the sample value register adapted to store the sample value.

8. The bridge device of claim 4, wherein the bridge fabric comprises a wireless transmission medium.

9. The bridge device of claim 4, wherein the bridge fabric comprises a protocol adapted to facilitate communications over a local area network.

10. The bridge device of claim 9, wherein the local area network comprises a wireless transmission medium.

11. A bridge device for use with a first portal in data communication with a second portal, comprising:
   a first module adapted to generate an error condition if a downstream device does not receive a first sample value and a second sample value within a first time period;
   a second module adapted to sample a timer associated with the first portal to obtain the first sample value;
   a third module adapted to sample a timer associated with the second portal to obtain the second sample value;
   a fourth module adapted to calculate delays in propagation over said bridge device; and
   wherein the bridge device is adapted to communicate with software configured to transmit the first sample value and the second sample value to the downstream device.

12. The bridge device of claim 11, further comprising a sample value register, the sample value register adapted to store the first sample value and the second sample value.

13. The bridge device of claim 11, wherein the fourth module is adapted to calculate delays in propagation over said bridge device based at least in part upon the first sample value and the second sample value.

14. The bridge device of claim 11, wherein the bridge device comprises a wireless transmission protocol.

15. The bridge device of claim 11, wherein the bridge device comprises a protocol adapted to facilitate communications over a local area network.

16. The bridge device of claim 11, wherein said bridge device is adapted for use in an IEEE Std. 1394 compliant serial bus network.

17. A computerized system, comprising:
   a plurality of buses interconnected by a plurality of bridges, said plurality of bridges comprising a first bridge and a second bridge, the second bridge comprising a first portal;
   wherein the first bridge comprises a second portal, a third portal, and a bridge fabric, the first portal in communication with the third portal via the bridge fabric;
   wherein the first portal is adapted to perform said calculation of said correction only when the sample value is received by the first portal within a first time period, and indicate an error condition at least when the sample value is not received by the first portal within the first time period;
   wherein the second portal is adapted to receive a cycle synchronization event and upon receiving said event, transmit a synchronization signal through the bridge fabric to the third portal;
   wherein the third portal is adapted to receive the synchronization signal, sample a local timer to obtain a sample value, and transmit the sample value to the first portal;
   wherein the first portal is adapted to receive the sample value, use the sample value to compensate for at least some delays in transmission over the bridge, and calculate a correction to be applied to a timer associated with the first portal.

18. A bridge device for use with a first portal that is in data communication with a second portal via a bridge fabric, the device comprising:
   a first module adapted to measure delays in propagation over the bridge fabric;
   a second module adapted to access a timer associated with the first portal, and provide a sample value based at least in part on said access;
   a third module adapted to calculate a correction to be applied to a timer associated with a downstream portal if the sample value is provided within a first time period, wherein said correction is based at least in part upon the sample value and upon delays in propagation over the bridge fabric; and
   a fourth module adapted to indicate an error if the sample value is not successfully provided within the first time period.

19. The bridge device of claim 18, wherein the fourth module is further adapted to indicate an error by setting one or more error flags.

20. A method for bridging a first portal that is in data communication with a second portal via a bridge fabric, comprising:
   measuring delays in propagation over the bridge fabric;
   accessing a timer associated with the first portal, and
   providing a sample value based at least in part on said access;
   calculating a correction to be applied to a timer associated with a downstream portal if the sample value is provided within a first time period, wherein said correction is based at least in part upon the sample value and upon delays in propagation over the bridge fabric.

21. The method of claim 20, further comprising the downstream portal; wherein the third module is associated with the downstream portal.

22. The method of claim 20, additionally comprising generating an interrupt when the timer associated with the first portal is sampled.

23. The method of claim 20, additionally comprising storing a sample value to a sample value register.

24. The method of claim 20, wherein the bridge fabric comprises a wireless transmission medium.

25. The method of claim 20, wherein the bridge fabric comprises a protocol adapted to facilitate communications over a local area network.

26. The method of claim 25, wherein the local area network comprises a wireless transmission medium.

* * * * *